Figure 1:
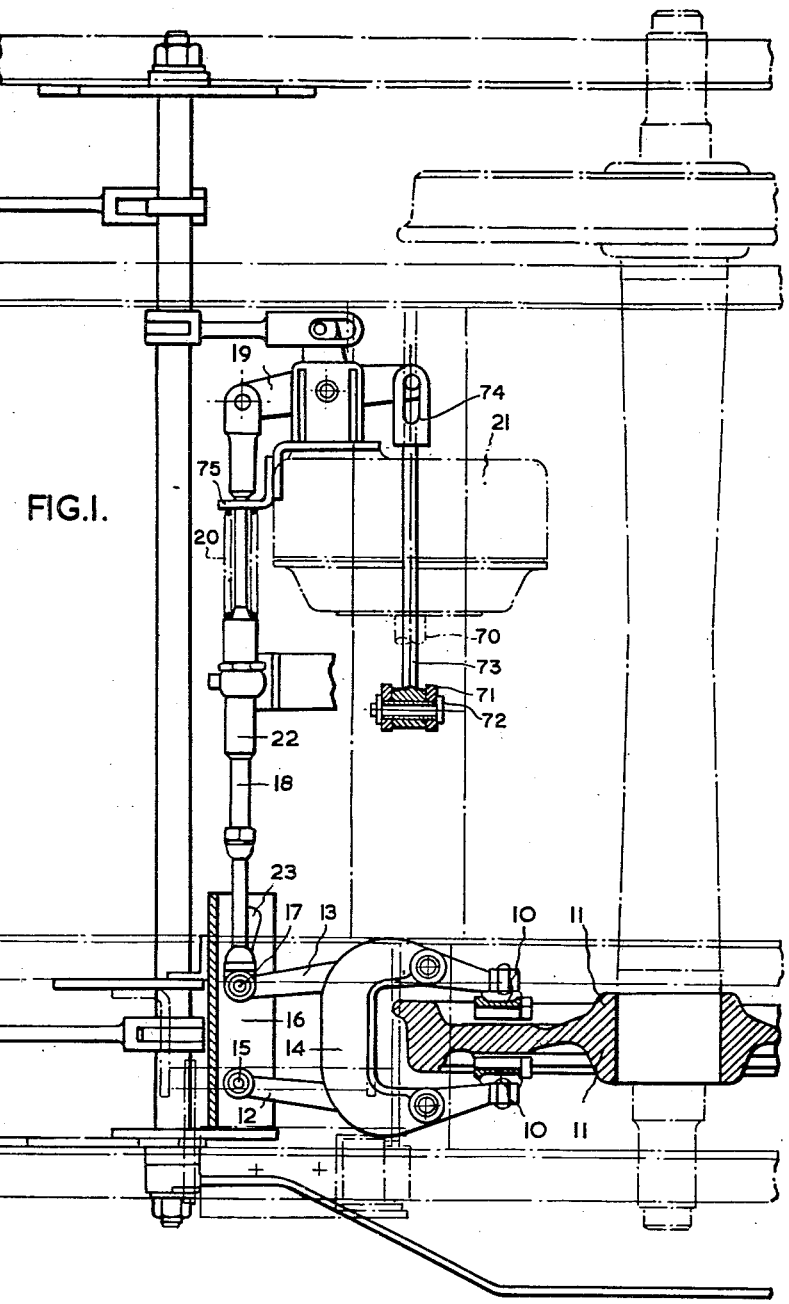

Feb. 25, 1964    C. J. PARTON    3,122,218
DISC BRAKES FOR RAILWAY VEHICLES
Filed Oct. 28, 1960    3 Sheets-Sheet 1

Clifford J. Parton Inv.
by Scrivener & Parker Att'ys

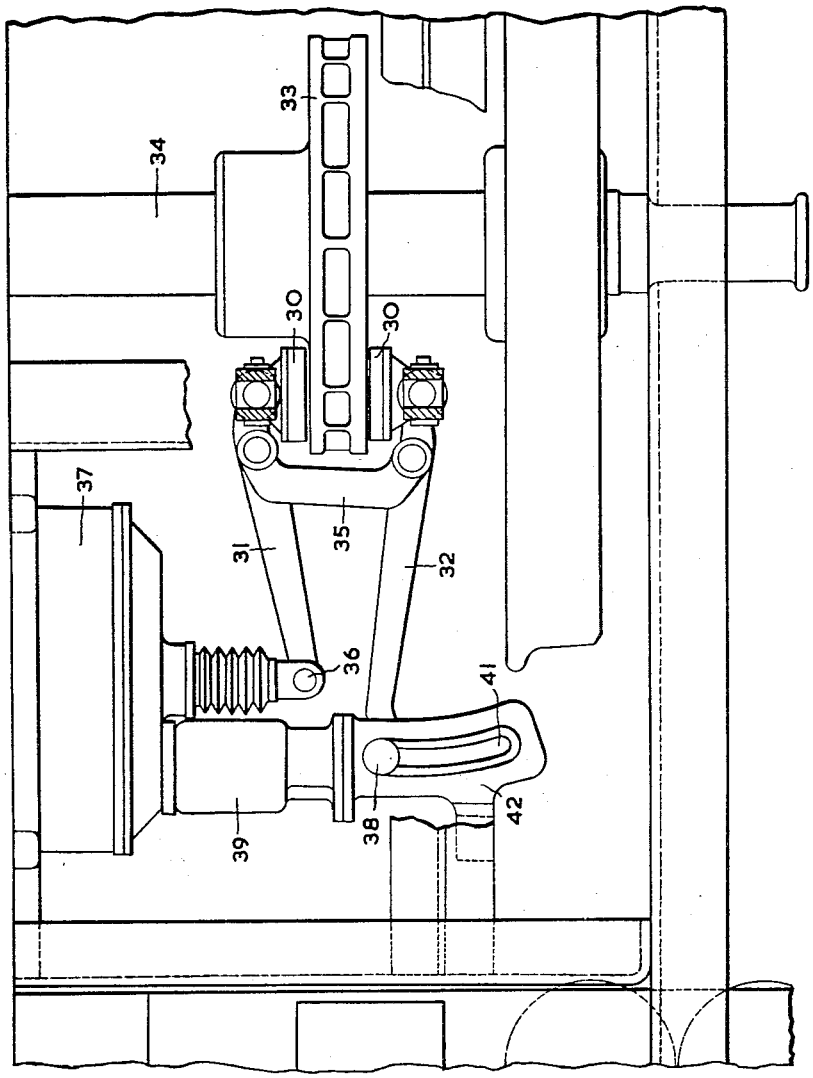

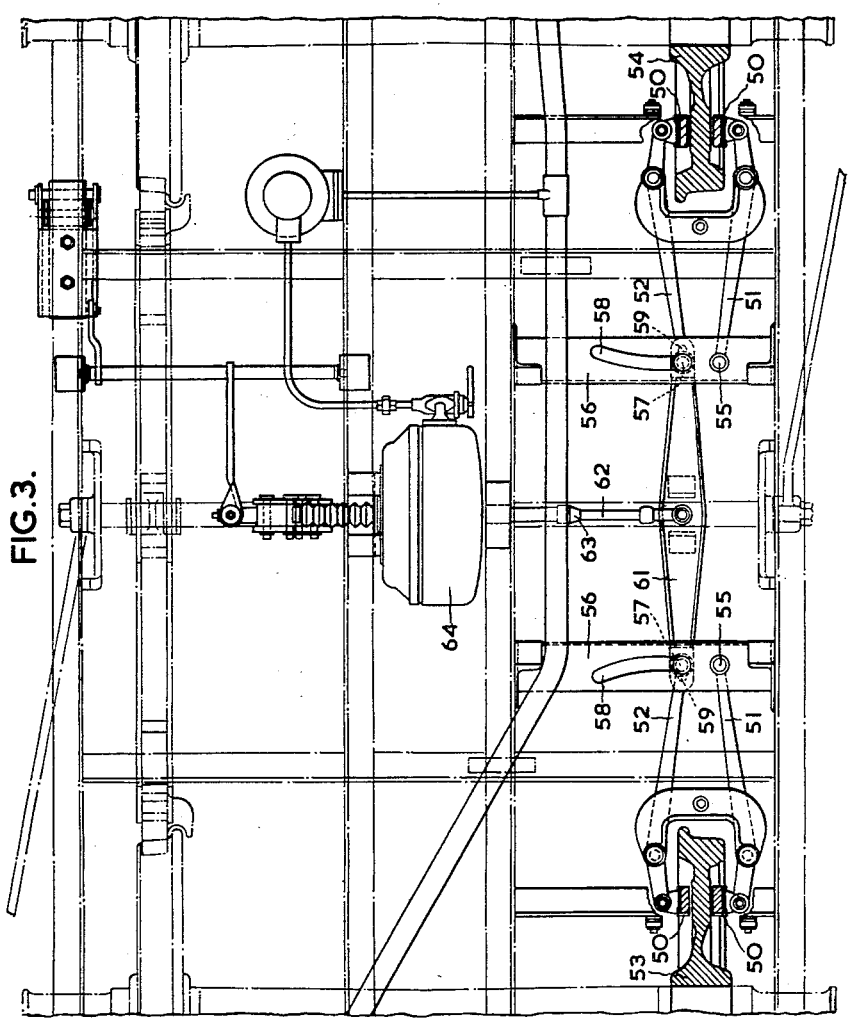

United States Patent Office 3,122,218
Patented Feb. 25, 1964

3,122,218
DISC BRAKES FOR RAILWAY VEHICLES
Clifford John Parton, Yardley, Birmingham, England, assignor to Girling Limited, Birmingham, England, a British company
Filed Oct. 28, 1960, Ser. No. 65,809
9 Claims. (Cl. 188—59)

This invention relates to improvements in disc brakes for railway vehicles, and relates more particularly to disc brakes of the kind in which friction pads adapted to engage opposed braking surfaces on a wheel or on a brake disc mounted on an axle are mounted on the inner ends of co-operating caliper levers. The outer end of one caliper lever pivots about a fixed point on the vehicle, or bogie frame, and the outer end of the other lever is coupled to actuating means which may be mechanical, hydraulic or pneumatic.

It is common practice to provide an automatic slack adjuster which either progressively reduces the effective length of the coupling between the actuating means and the second lever, or changes the position of the outer end of the first lever as the friction pads wear so that the angular relationship between the two caliper levers changes.

This has the effect of producing a radial movement of the shoes relative to the axis of the wheel or brake disc and affects the alignment of the shoes with the braking surfaces on the wheel or disc. Where the brake shoes co-operate with a wheel, the braking surfaces may be formed by annular machined surfaces on a thickened part of the web of the wheel and these surfaces may be of a radial width little or no greater than the width of the brake shoes so that it is desirable that any appreciable radial movement of the shoes should be prevented.

According to our invention, in a disc brake of the kind set forth, the outer end of one of the caliper levers is positively guided in such a manner that the radial position of the shoes is maintained substantially constant throughout the life of the friction pads or linings.

The outer end of the actuated caliper lever may for example be guided in a curved slot or an inclined straight slot in a fixed bracket or the like, the form and position of the slot being arranged to restrict radial movement of the brake shoes.

In an alternative arrangement the outer end of one caliper lever is coupled directly to an actuator and it is the outer end of the non-actuated lever of which the position is automatically adjusted to take up wear. In that case, the outer end of the non-actuated lever is guided in an arcuate slot and its position along the length of the slot is controlled by an automatic slack adjuster.

Some practical forms of brakes for rail vehicles incorporating our invention are illustrated by way of example in the accompanying drawings in which:

FIGURE 1 is a plan of one brake layout,
FIGURE 2 is a plan of another layout,
FIGURE 3 is a plan of a third layout incorporating brakes on aligned wheels of adjacent axles.

In the layout shown in FIGURE 1, brake shoes 10 adapted to engage annular braking surfaces on opposite sides of a wheel 11 of a rail vehicle are pivotally mounted on the inner ends of caliper levers 12, 13 pivoted in a suspended yoke 14 which straddles the periphery of the wheel. The outer end of the caliper lever 12 is pivoted at 15 on a fixed bracket 16 secured to the frame of the vehicle or bogie. The outer end of the other caliper lever 13 is coupled by a pin 17 and a rod 18 to a lever 19 actuated by a fluid pressure motor 21 mounted on the frame. The motor 21 is shown in phantom lines inasmuch as it is mounted on the frame in a plane above the lever 19. The arrangement is such that the piston or diaphragm rod 70 of the motor is connected at its free end to the upper end of a rocking lever 71 pivoted at an intermediate point (not shown) in its length on the frame, and the other end of the lever 71 is pivotally connected by a pin 72 to one end of a rod 73. The other end of the rod carries a slotted eye 74 coupled to the lever 19. The aforementioned rod 18 incorporates a totally enclosed single-acting slack adjuster 22 and is loaded by a compression spring 20 interposed between the slack adjuster and a fixed lug 75 through which the rod passes. The pin 17 is guided for movement away from the plane of the wheel and toward the axis thereof in an arcuate slot 23 in the bracket of such a form that, as the pin is moved outwardly by the slack adjuster when wear of the friction surfaces of the brake shoes takes place, the radial position of the shoe carried by the caliper lever 13 relative to the wheel is maintained substantially constant. Means are also incorporated for applying the brake mechanically, but as these are on standard lines, they need not be described in detail.

In the alternative construction shown in FIGURE 2, brake shoes 30 pivotally mounted on the inner ends of caliper levers 31, 32 are adapted to engage opposite faces of a brake disc 33 mounted on a running axle 34. The caliper levers are pivotally mounted on a suspended yoke 35.

The outer end of the caliper lever 31 is pivotally coupled by a pin 36 to the piston rod of a fluid pressure actuator 37 for applying the brake. The outer end of the other or non-actuated caliper lever 32 is relatively movable with respect to the first lever and carries a pin 38 by which it is coupled to an hydraulic slack adjuster 39 and which is guided in an arcuated slot 41 in a fixed bracket 42. The position of the pin along the length of the slot is automatically adjusted by the slack adjuster and the positive guiding of the pin in the slot maintains the radial position of the shoe carried by the caliper lever 32 relative to the disc substantially constant. The lever 32 of which the outer end is positively guided, accommodates the movements due to wear of the friction surfaces of both brake shoes 10 so that the radial movement of the other shoes carried by the lever 31 is very small in comparison.

In the arrangement shown in FIGURE 3, duplicated brakes each incorporating shoes 50 pivotally mounted on the inner ends of caliper levers 51, 52 are applied to aligned wheels 53, 54 on adjacent axles. The caliper lever 51 of each brake pivots about a fixed pivot 55 on a frame member 56. The outer end of each caliper lever 52 has fixed in it a pin 57 guided in an arcuate slot 58 in the frame member 56. The pins 57 are received in slots 59 in opposite ends of a balance bar 61 coupled by a rod 62 incorporating an automatic slack adjuster 63 to a fluid pressure actuator 64. The slots 59 maintain the radial positions of the brake shoes as the pins are moved towards the actuator to take up wear of the friction members carried by the shoes.

I claim:
1. A disc brake for a vehicle wheel of the type including a disc fixed for rotation with said wheel, a yoke straddling the periphery of said disc, a pair of co-operating caliper levers having inner and outer ends pivotally connected to said yoke intermediate their ends, friction pads carried at the inner ends of said lever for braking engagement with the opposing faces of said disc, actuator means operatively connected to said levers for effecting relative movement of the outer ends thereof away from each other to apply the brakes, and guide means engaging the movable outer end of at least one of said levers, said guide means extending away from the plane of said disc but sloping in the direction of the axis thereof whereby the friction pad of a lever engaging said guide means occupies a brake-applied radial position which is substantially constant with respect to the axis of the disc throughout the wear life of the pad.

2. A disc brake for a vehicle wheel of the type including a disc fixed for rotation with said wheel, a movable yoke straddling the periphery of said disc, a pair of co-operating caliper levers having inner and outer ends and pivotally connected to said yoke intermediate their ends, frictional pads carried at the inner ends of said levers for braking engagement with the opposing faces of said disc, a fixed pivot connected to the outer end of one of said levers, an actuator connected to the outer end of other of said levers for moving the same towards and away from the outer end of said first lever to release and apply the brakes, guide means engaging the outer end of said second lever, said guide means sloping away from the plane of said disc but toward the axis thereof whereby as the outer end of the lever is moved away from the plane of the disc the friction pad on the inner end of said lever is moved into a brake applied position which is substantially constant with respect to the axis of the disc throughout the wear life of the pad.

3. The disc brake of claim 2 wherein said guide means comprises a stationary bracket, an inclined slot in said bracket and a pin in the other end of the caliper lever slideable in said slot.

4. The disc brake of claim 3 wherein said slot is arcuate.

5. The disc brake of claim 1 wherein an automatic slack adjuster is interposed between said actuator and the outer end of said second caliper lever.

6. A disc brake for vehicles comprising a disc, co-operating first and second caliper levers having inner and outer ends, a yoke in which said caliper levers are pivotally mounted intermediate their ends, friction members carried by the inner ends of said caliper levers for braking engagement with opposite faces of said disc, an automatic slack adjuster for adjusting the outer end of one of said levers away from the plane of said disc as the friction members wear, inclined guide means co-operating with the outer end of the adjustable caliper lever for guiding the same inwardly toward the axis of said disc as the outer end is positioned away from the plane of said disc by said slack adjuster as the friction members wear, and an actuator coupled to the outer end of the other of said caliper levers.

7. A disc brake for vehicles comprising a disc rotatable about a fixed axis, co-operating caliper levers having inner and outer ends, a yoke in which said caliper levers are pivotally mounted intermediate their ends, friction members carried by the inner ends of said levers for braking engagement with opposite faces of said rotatable member, an actuator operatively connected to said levers for effecting relative movement of the outer end of one of said levers towards and away from the outer end of the other of said levers to release and apply the brakes, and stationary guiding means for the outer end of one of said caliper levers, said guiding means sloping away from the plane of said disc but in the direction of the axis thereof to effect compensating inward movement of the guided lever for maintaining the radial position of the friction member on the inner end thereof substantially constant relative to the axis of the disc throughout the wear life of said friction member.

8. A disc brake for vehicles comprising a disc rotatable about a fixed axis, co-operating first and second caliper levers having inner and outer ends, a yoke in which said levers are pivotally mounted intermediate their ends, friction members carried on the inner ends of said levers for engagement with opposite faces of said disc, stationary mounting means for the outer end of one of said caliper levers, an actuator coupled to the outer end of the other of said caliper levers, guide means disposed adjacent the outer end of said second caliper lever for guiding the same, said guide means sloping away from the plane of said disc but towards the axis thereof to effect compensating inward movement of said second caliper lever as the outer end is moved by said actuator away from the plane of the disc whereby the radial position of the friction member of said lever with respect to the axis of the disc remains substantially constant throughout the wear life of the member.

9. The disc brake of claim 8 wherein the guide means comprises a stationary bracket, an arcuate slot in said bracket and a pin in the caliper lever slideable in said slot.

References Cited in the file of this patent

UNITED STATES PATENTS

| | | |
|---|---|---|
| 1,809,729 | Sauvage | June 3, 1931 |
| 2,211,888 | Farmer | Aug. 20, 1940 |
| 2,284,605 | Eksergian | May 26, 1942 |
| 2,291,016 | Aurien | July 28, 1942 |
| 2,342,083 | Ledwinka | Feb. 15, 1944 |
| 2,382,223 | Hicks | Aug. 14, 1945 |
| 2,812,831 | Coskun | Nov. 12, 1957 |
| 2,848,071 | Holin | Aug. 19, 1958 |
| 2,954,102 | Busch | Sept. 27, 1960 |
| 2,973,841 | McLure | Mar. 7, 1961 |

FOREIGN PATENTS

| | | |
|---|---|---|
| 823,579 | Great Britain | Nov. 11, 1959 |
| 828,873 | Great Britain | Feb. 24, 1960 |